No. 883,625. PATENTED MAR. 31, 1908.
F. B. COOK.
CABLE TERMINAL.
APPLICATION FILED JULY 12, 1907.

2 SHEETS—SHEET 1.

WITNESSES:
Frederick R. Parker
H. Roy Cook

INVENTOR:
Frank B. Cook.

No. 883,625. PATENTED MAR. 31, 1908.
F. B. COOK.
CABLE TERMINAL.
APPLICATION FILED JULY 12, 1907.

2 SHEETS—SHEET 2.

WITNESSES: Frederick R. Parker. H. Roy Cook.

INVENTOR: Frank B. Cook.

UNITED STATES PATENT OFFICE.

FRANK B. COOK, OF CHICAGO, ILLINOIS.

CABLE TERMINAL.

No. 883,625.  Specification of Letters Patent.  Patented March 31, 1908.

Application filed July 12, 1907. Serial No. 383,419.

*To all whom it may concern:*

Be it known that I, FRANK B. COOK, a citizen of the United States of America, residing at Chicago, in the county of Cook and State of Illinois, have invented a new and useful Cable Terminal, of which the following is a specification, reference being had to the accompanying drawings, illustrating same.

My invention relates to cable terminals used in connection with telephone, telegraph, or other electrical cables, for the purpose of distributing the conductors of the cables and for protecting same against injurious electricity of various forms.

The principal object of my present invention is to provide an improved construction in the type of cable terminal set forth in my co-pending application for Letters Patent on cable terminal, filed May 28, 1906, Serial No. 319,136.

Other objects will be apparent from the following specification.

The cable terminal of my present invention is of the open type, that is, of a type adapted for use with a pot-head, the cable conductors being pot-headed before they are distributed at the terminal. In this invention the protector units, preferably comprising the usual inclosed fuses and lightning arresters, are mounted circumferentially around circular sheet-metal portions, the said circular sheet-metal portions being formed in sections the edges of which are turned outwardly to provide flanges for bolting the circular portions together and for forming supports for a cylindrical cover which is placed over the terminal as a whole. This construction in the circular sheet-metal protector mounting portions and flanged guiding portions for the terminal cover, is of great advantage in the manufacture of such cable terminals, as it greatly simplifies the terminals and thereby lessens their cost.

Figure 1:
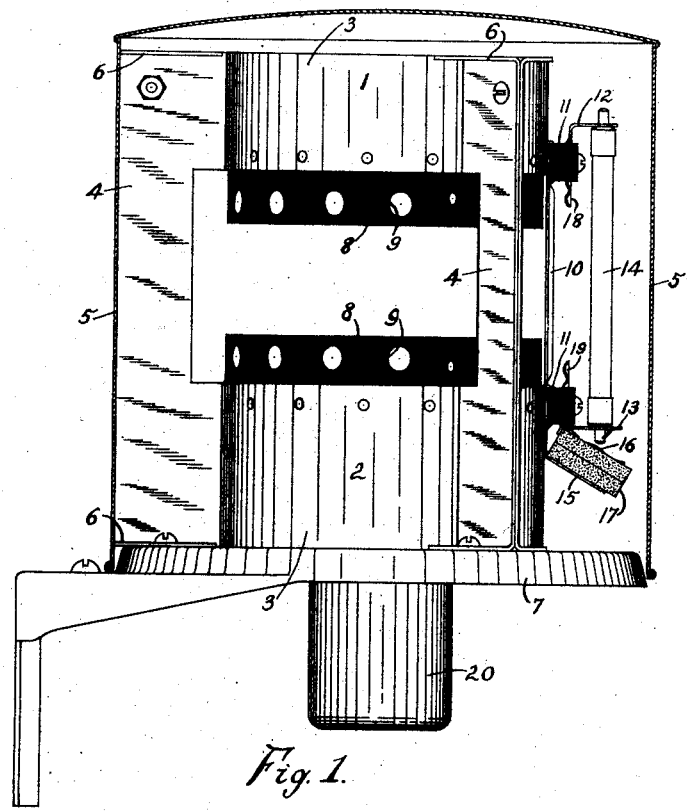
Figure 2:
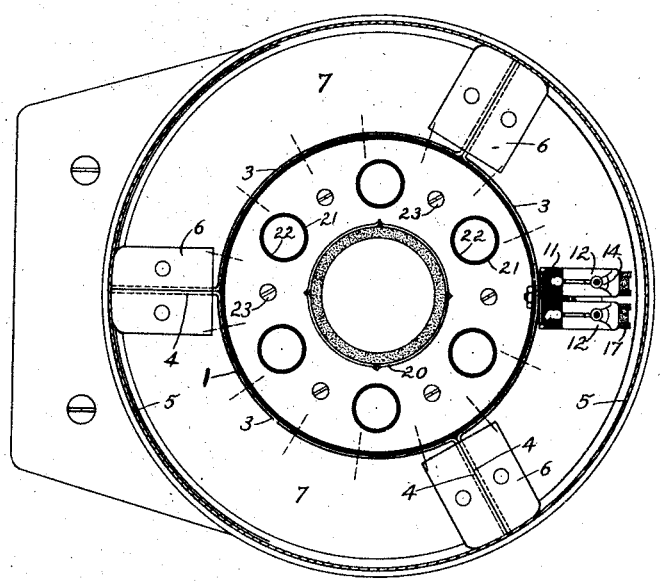

In the accompanying drawings, Figure 1 is a side elevation of the cable terminal of my present invention, with some of the protector units removed and the cover for the terminal shown in vertical cross-section; and Fig. 2 is a plan view of Fig. 1, the cover for the terminal being shown in transverse cross-section.

Like characters refer to like parts in the several figures.

The sheet-metal protector mounting rings 1 and 2 are made in sections 3 3 3, each section 3 comprising a portion of rings 1 and 2 and two flanged portions 4 4. When the cable terminal is assembled, two flanged portions 4 4 are bolted together as shown in the drawings, thereby providing complete circular mounting rings 1 and 2 for the protective apparatus, and a plurality (preferably 3) of vertical guides for the cylindrical sheet-metal cover 5. The ends of flanges 4 4 are preferably formed over as at 6 6, the lower portions 6 6 being bolted to the circular mounting plate 7 and the upper portions 6 6 being adapted to be bolted to the lower portions 6 6 of another circular protector mounting section, if desired, to make the terminal twice the height of the terminal shown in the drawings, and therefore of twice the capacity. The sections 3 3 3 of the protector mounting rings 1 and 2 and guides 4 4, are preferably all similar to each other so that they may be readily punched and formed in a press at a minimum cost. Inside of the sheet-metal mounting rings 1 and 2 are provided strips of insulation 8 8, each strip 8 being provided with holes 9 9 therethrough through which conductors leading to the terminal are distributed to the protective apparatus. The strips 8 8 are for the purpose of insulating the said conductors from the sheet-metal rings 1 and 2 of the terminal.

Around the exterior of the mounting rings 1 and 2, and between the flanges 4 4, are mounted a series of protector units, arranged preferably vertically, each protector unit comprising a metallic strip 10 carrying a pair of insulating blocks 11 11, a pair of spring members 12 12 carried by one insulating block 11, a pair of spring members 13 13 carried by the other insulating block 11, a pair of tubular fuses 14 14 carried by the spring members 12 12 and 13 13, a turned-up portion 15 at one end of strip 10, a pair of spring members 16 16, and a pair of lightning arresters 17 17 carried between the spring members 16 16 and the turned-up portion 15. Any number of these protector units, up to the capacity of the cable terminal, may be mounted individually on the rings 1 and 2 as desired.

When the cable terminal is in use, all of the metallic strips 10 10 are connected to ground by grounding base plate 7, so as to provide a suitable ground connection for the lightning arresters 17 17. Each spring member 12 is provided with a connection terminal 18 for receiving an aerial conductor, and each spring member 13 is provided with a connection terminal 19 for receiving a cable conductor. A nozzle 20, preferably of the self-soldering type, the features of which are well understood, extends through the center of the base plate 7 and projects therebelow preferably as shown in Fig. 1. The nozzle 20 is for the purpose of receiving and supporting a pot-head which is connected with the cable which is to be brought to the terminal. Between the nozzle 20 and the ring 2 is provided a series of holes 21 21 through the base plate 7, through which holes the aerial conductors extend to the connection terminals 18 18. On the lower side of base plate 7 is provided a disk of insulation having holes 22 22 therethrough concentric with holes 21 21 and somewhat smaller than the latter said holes, so as to insulate the conductors passing through holes 22 22 and 21 21 from the metal base plate 7. The said disk of insulation is preferably secured to the base plate 7 by bolts 23 23.

The circuit of each conductor through the cable terminal is from the cable and pot-head connected therewith, through a hole 9 in the lower insulating ring 8 to a connection terminal 19, through a spring 13, an inclosed fuse 14, a spring 12 and connection terminal 18, through a hole 9 in the upper insulating ring 8, and through a hole 22 in the base of the terminal to an aerial conductor.

The cable terminal shown in the drawings is constructed for 15 pairs of the protective apparatus, or for 15 individual protector units, there being room for 5 of the protector units between each two flanges 4 4 of each sectional sheet-metal portion 1 2 4 4 of the terminal. The capacity of such a terminal may be readily increased to any desired amount. If it is desired to double the capacity of the cable terminal this can be readily done by mounting one protector mounting section, or complete mounting ring, on top of another and thereby doubling the height of the terminal.

It will readily be seen that the cable terminal herein provided is very light, durable, simple, cheap to manufacture, and readily accessible at all parts.

I do not wish to limit this invention to all of the minor details of construction as herein shown and described, as many modifications may be made therein without departing from the spirit of the invention.

What I claim as new and desire to secure by Letters Patent, is:

1. A cable terminal of the character described comprising a suitable base, protector mounting sections mounted vertically on the said base, each section comprising two curved portions and flanged portions at the ends of the curved portions, whereby two protector mounting rings and a plurality of radially-extending flange portions are provided when the said sections are suitably placed together, means for suitably securing the said sections together, means for accommodating electrical conductors leading to the interior of the said rings, and means for suitably mounting protective apparatus on the exterior of the said rings.

2. A cable terminal of the character described comprising a suitable base, protector mounting sections mounted vertically on the said base, each section comprising a plurality of curved portions and flanged portions at the ends of the curved portions, whereby a plurality of protector mounting rings and a plurality of radially-extending flange portions are provided when the said sections are suitably placed together, means for suitably securing the said sections together, means for accommodating electrical conductors leading to the interior of the said rings, means for suitably mounting protective apparatus on the exterior of the said rings, and a suitable cover placed over the terminal as a whole, the said flange portions forming guides for the cover.

3. A cable terminal of the character described comprising a suitable base, protector mounting sections mounted vertically on the said base, each section comprising a curved portion and flanged portions at the ends of the curved portion, whereby a protector mounting ring and a plurality of radially-extending flange portions are provided when the said sections are suitably placed together, means for suitably securing the said sections together, means for accommodating electrical conductors leading to the interior of the said ring, and means for suitably mounting protective apparatus on the exterior of the said ring between the said radially-extending flange portions.

4. A cable terminal of the character described comprising a suitable base, protector mounting sections mounted vertically on the said base, each section comprising two curved portions and flanged portions at the ends of the curved portions, whereby two protector mounting rings and a plurality of radially-extending flange portions are provided when the said sections are suitably placed together, means for suitably securing the said sections together, means for accommodating electrical conductors leading to the interior of the said rings, protective devices mounted on the exterior of the said rings between the said flange portions, and insulating strips carried by the said rings, for carrying the conductors leading to the protective devices, whereby the said conductors are insulated from the said rings.

5. A cable terminal of the character described comprising a circular base, a plurality of protector mounting sections mounted vertically on the said base, each section being provided with protector mounting portions and flanged portions at the edges thereof, whereby a plurality of vertical guides are provided when the said flanged portions are suitably placed together, means for suitably securing the said flanged portions together, means for accommodating electrical conductors leading through the base portion of the terminal, and a cylindrical cover placed over the terminal as a whole and held in place by the said vertical guides.

6. A cable terminal of the character described comprising a circular sheet-metal base, a plurality of sheet-metal protector mounting sections each provided with flanged portions, means for bolting the said flanged portions together and mounting them to the said base whereby a plurality of vertical guides are provided, a series of protector units mounted vertically between the said vertical guides, and a cylindrical sheet-metal cover placed over the terminal as a whole and held in position by the said guides.

7. A cable terminal of the character described comprising a circular sheet-metal mounting base having a bracket for suitably mounting same, a protector mounting ring mounted on the said base, protective apparatus carried by the said ring, a suitable nozzle extending through the center of the said base for accommodating a cable or pothead leading to the terminal, said base having a plurality of holes therethrough between the said ring and nozzle, for accommodating aerial conductors leading to the terminal, and a disk of insulation secured to the said base and having holes therein substantially concentric with the said plurality of holes in the base but somewhat smaller than the latter said holes, whereby the said aerial conductors are insulated from the base where they pass through same.

8. A cable terminal of the character described comprising a suitable base, a plurality of protector mounting sections mounted vertically on the said base and secured together to provide a plurality of protector mounting rings, said rings having a plurality of vertical radially-extending guides for a cover, protective apparatus carried by the said rings, and means whereby other protector mounting sections substantially similar to the first may be mounted on top of the first to increase the height and capacity of the terminal as desired.

As inventor of the foregoing I hereunto subscribe my name in the presence of two subscribing witnesses, this 9th day of July, 1907.

FRANK B. COOK.

Witnesses:
FREDERICK R. PARKER,
C. C. NEWBURN.